United States Patent
Kwon et al.

(10) Patent No.: US 8,396,316 B2
(45) Date of Patent: Mar. 12, 2013

(54) METHOD AND APPARATUS FOR PROCESSING IMAGE

(75) Inventors: Joon-hwan Kwon, Suwon-si (KR); Kwang-min Kim, Seoul (KR); Man-seok Kang, Suwon-si (KR); Seung-soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 12/722,927

(22) Filed: Mar. 12, 2010

(65) Prior Publication Data

US 2011/0116716 A1    May 19, 2011

(30) Foreign Application Priority Data

Nov. 16, 2009  (KR) .................. 10-2009-0110501

(51) Int. Cl.
*G06K 9/40*    (2006.01)
*G06K 9/48*    (2006.01)

(52) U.S. Cl. ...................... 382/255; 382/199

(58) Field of Classification Search .......... 382/103, 382/115–118, 199, 218, 274, 275, 286, 173, 382/255, 264, 284, 312; 358/453, 461, 463; 345/629

See application file for complete search history.

(56) References Cited

U.S. PATENT DOCUMENTS

| | | | |
|---|---|---|---|
| 6,298,145 B1 * | 10/2001 | Zhang et al. | 382/103 |
| 6,611,613 B1 * | 8/2003 | Kang et al. | 382/118 |
| 6,697,502 B2 * | 2/2004 | Luo | 382/115 |
| 7,515,739 B2 * | 4/2009 | Porter et al. | 382/118 |
| 7,860,280 B2 * | 12/2010 | Danowitz | 382/118 |
| 7,978,253 B2 * | 7/2011 | Watanabe | 348/345 |
| 7,990,429 B2 * | 8/2011 | Saito | 348/222.1 |
| 8,098,904 B2 * | 1/2012 | Ioffe et al. | 382/118 |

* cited by examiner

*Primary Examiner* — Kanjibhai Patel
(74) *Attorney, Agent, or Firm* — Sughrue Mion, PLLC

(57) ABSTRACT

A method, apparatus, and computer readable recording medium for processing an image. The method includes detecting a face area and a blur area from an image; checking a degree of overlap between the face area and the blur area by comparing a location of the face area with a location of the blur area; and determining whether the image is an abnormal image according to the degree of overlap between the face area and the blur area.

15 Claims, 5 Drawing Sheets

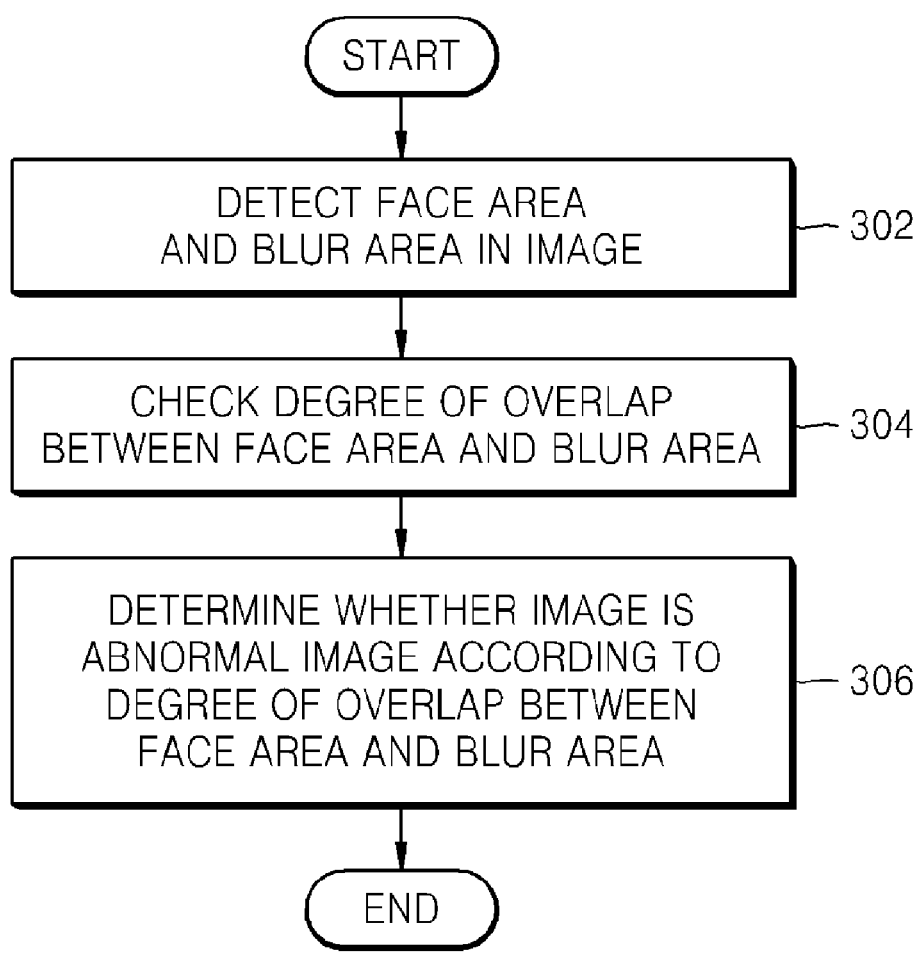

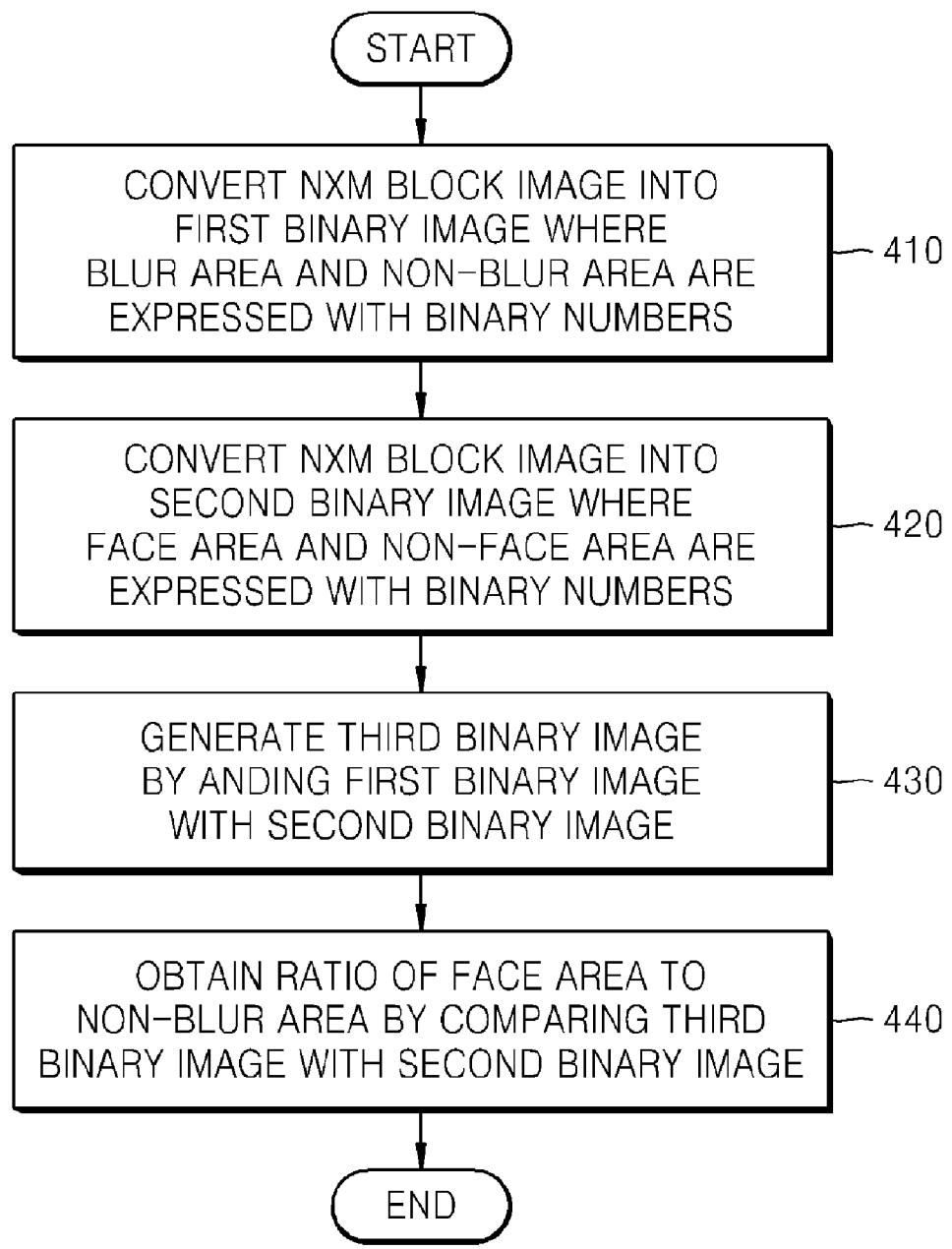

FIG. 5A

| 0 | 0 | 0 | 0 | 0 |
|---|---|---|---|---|
| 0 | 1 | 1 | 1 | 0 |
| 0 | 1 | 1 | 1 | 0 |
| 0 | 1 | 1 | 1 | 0 |
| 0 | 0 | 0 | 0 | 0 |

FIG. 5B

| 0 | 0 | 1 | 1 | 0 |
|---|---|---|---|---|
| 0 | 0 | 1 | 1 | 1 |
| 0 | 0 | 1 | 1 | 1 |
| 0 | 0 | 0 | 0 | 0 |
| 0 | 0 | 0 | 0 | 0 |

FIG. 5C

| 0 | 0 | 0 | 0 | 0 |
|---|---|---|---|---|
| 0 | 0 | 1 | 1 | 0 |
| 0 | 0 | 1 | 1 | 0 |
| 0 | 0 | 0 | 0 | 0 |
| 0 | 0 | 0 | 0 | 0 |

METHOD AND APPARATUS FOR PROCESSING IMAGE

CROSS-REFERENCE TO RELATED APPLICATION

This application claims priority from Korean Patent Application No. 10-2009-0110501, filed on Nov. 16, 2009, in the Korean Intellectual Property Office, the disclosure of which is herein incorporated by reference in its entirety.

BACKGROUND

1. Field

Methods, apparatuses, and computer readable mediums consistent with exemplary embodiments relate to a system for processing an image, and more particularly, to a method and apparatus for processing an image which can efficiently manage an image by using a face area and a blur area detected in the image.

2. Description of the Related Art

With the spread of apparatuses for processing an image, such as a digital camera, a camcorder, and a mobile phone with a camera function, the number of pictures taken by such apparatuses have increased exponentially.

Also, it is difficult for a user to manage such a great number of pictures without using a tool such as a photograph management program or a preview tool.

Related art tools, such as a picture management program and a preview tool, help the user to organize pictures by using information about shooting time, tag, location, color, event, etc.

The related art tools need to ferret out undesirable pictures and show the undesirable pictures to the user so that the user can remove the undesirable pictures, or need to exclude undesirable pictures taken during a slide show.

SUMMARY

Exemplary embodiments provide a method and apparatus for processing an image which can efficiently manage an image by using a face area and a blur area detected in the image.

According to an aspect of an exemplary embodiment, there is provided a method of processing an image, the method including detecting a face area and a blur area from an image; checking a degree of overlap between the face area and the blur area by comparing a location of the face area with a location of the blur area; and determining whether the image is an abnormal image according to the degree of overlap between the face area and the blur area.

The detecting of the face area and the blur area may include detecting the face area based on previously analyzed facial features, and detecting the blur area and a non-blur area of the image by analyzing a frequency component of the image.

The checking of the degree of overlap between the face area and the blur area may include inputting an original image having an original size and converting the original image into a first binary image in which the face area and the non-blur area are expressed with binary numbers; converting the original image having the original size into a second binary image in which the face area and the non-face area are expressed with binary numbers; generating a third binary image by ANDing the first binary image with the second binary image; and obtaining a ratio of the face area to the non-blur area by comparing the third binary image with the second binary image.

The obtaining of the ratio of the face area to the non-blur area may include obtaining a ratio of the face area to the non-blur area by comparing a number of pixels of an overlapping area between the face area and the non-blur area in the third binary image with a number of pixels of the face area in the second binary image.

If a plurality of faces are detected in the face area, the checking of the degree of overlap between the face area and the blur area may include determining whether there is overlap between the non-blur area and an area of a largest face from among the plurality of faces.

If a plurality of faces are detected in the face area, the checking of the degree of overlap between the face area and the blur area may include determining whether there is overlap between the non-blur area and an area of a face closest to a center of the image.

If a plurality of faces are detected in the face area, the checking of the degree of overlap between the face area and the blur area may include determining whether there is overlap between the non-blur area and an area of a face having a size greater than a threshold size.

If a ratio of the face area overlapping with the non-blur area is greater than a reference ratio, it may be determined that the image is a normal blur image, and if the ratio of the face area overlapping with the non-blur area is less than or equal to the reference ratio, it may be determined that the image is an abnormal blur image.

If it is determined that the image is an abnormal blur image, the method may further include automatically correcting or removing the image.

According to another aspect of an exemplary embodiment, there is provided an apparatus for processing an image, the apparatus including a blur detecting unit that analyzes a frequency component of an image and detecting a blur area in the image; a face area detecting unit that detects a face area in the image based on previously analyzed facial features; a location comparing unit that obtains a ratio of the blur area to the face area by comparing a location of the blur area detected by the blur detecting unit with a location of the face area detected by the face detecting unit; and a post-processing unit that determines whether the image is an abnormal image according to a result of the comparison performed by the location comparing unit, and corrects or removes the image if it is determined that the image is an abnormal image.

The post-processing unit may determine whether a blur occurring in the image is intended according to the result of the comparison performed by the location comparing unit, and restore the image or consider the image an undesirable image according to a result of the determination of whether the blur occurring in the image is intended.

BRIEF DESCRIPTION OF THE DRAWINGS

The above and other features and advantages of will become more apparent by describing in detail exemplary embodiments thereof with reference to the attached drawings in which:

FIG. 1 is a block diagram of an apparatus for processing an image, according to an exemplary embodiment of;

FIG. 3A is a flowchart illustrating an example of a method of processing an image, according to an exemplary embodiment of;

FIG. 4 is a flowchart illustrating an example of a process of checking a degree of overlap between a face area and a non-blur area in the method of FIG. 3A; and FIGS. 5A through 5C are conceptual views illustrating an example of a method of obtaining pixels included in a face area and a non-blur area.

DETAILED DESCRIPTION

Exemplary embodiments will now be described more fully with reference to the accompanying drawings, in which the exemplary embodiments are shown.

Before explaining the configuration of an apparatus for processing an image, according to an exemplary embodiment of, the apparatus' approach to processing an image will be explained first.

Apparatuses for processing an image, such as a digital camera and a camcorder, generate a blur image that is an entirely or partially unclear image shown on a screen.

Such a blur image may be classified into a motion blur image which is generated due to the motion of a subject, and an out-of-focus blur image which is generated when a device, such as a complementary metal-oxide semiconductor (CMOS), fails to focus. In some cases, the blur image may be intended by the photographer or device user. Such a case may be when the device user desires to create a photographic or graphic special effect or an artistic effect.

Exemplary embodiments determine whether a blur image is intended, or is generated due to a limitation of a photographing device by using face detection technology. Accordingly, exemplary embodiments display an image on a screen according to a result of the determination so that a user can determine whether the image should be automatically restored or is an undesirable image.

Figure 1:
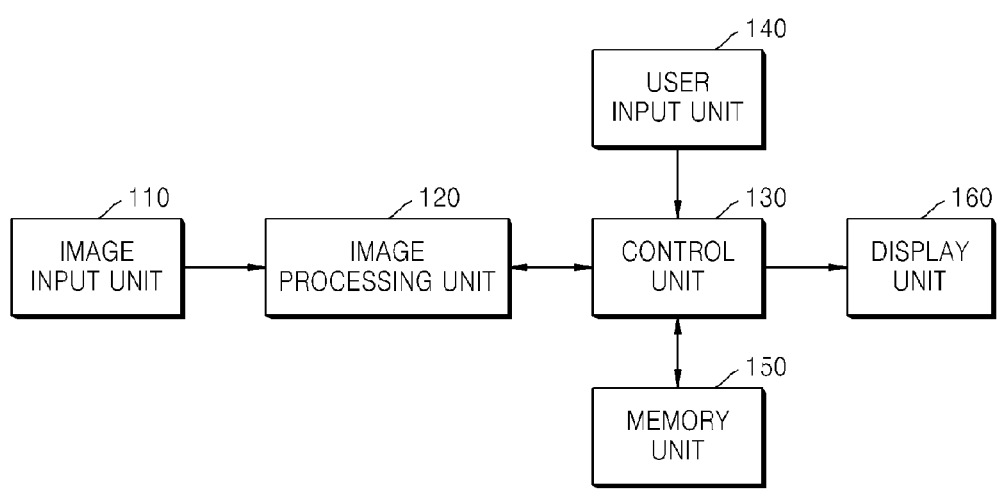

FIG. 1 is a block diagram of an apparatus for processing an image, according to an exemplary embodiment of.

Referring to FIG. 1, the apparatus includes an image input unit 110, an image processing unit 120, a control unit 130, a user input unit 140, a memory unit 150, and a display unit 160.

The elements of the apparatus are connected using a bus that is a data transmission path.

The image input unit 110 inputs an image that is, for example, stored by the apparatus or captured by a camera.

The image processing unit 120 detects a face area and a blur area (or a non-blur area) in the image input using the image input unit 110, and determines whether the image is an abnormal blur image by comparing a location of the face area with a location of the blur image (or the non-blur image). The image processing unit 120 processes the image using hardware, e.g., a signal processing unit and/or software, e.g., signal processing software.

The user input unit 140 inputs a user manipulation command related to the image processing using a plurality of keys or using a screen touch.

The control unit 130 controls each of the elements of the apparatus, displays on a screen a menu indicating whether the image is to be restored or to be removed according to a result of the determination of whether the image is an abnormal blur image, and controls the image processing unit 120 to correct or remove the abnormal blur image according to the user manipulation command input from the user input unit 140. The control unit 130 includes, for example, a micro processing unit (MPU) or an integrated circuit having a plurality of circuits for performing control functions.

The memory unit 150 stores a plurality of images processed by the image processing unit 120, and data related to user manipulation. The memory unit 150 may be a magnetic recording medium, e.g., a hard disk, or a non-volatile memory, e.g., an electrically erasable and programmable read only memory (EEPROM) or a flash memory, but the present exemplary embodiment is not limited thereto.

The display unit 160 is controlled by the control unit 130 to display the images processed by the image processing unit 120.

Accordingly, the apparatus of FIG. 1 can efficiently manage an image by determining whether a blur occurring in the image is normal or abnormal.

Figure 2:
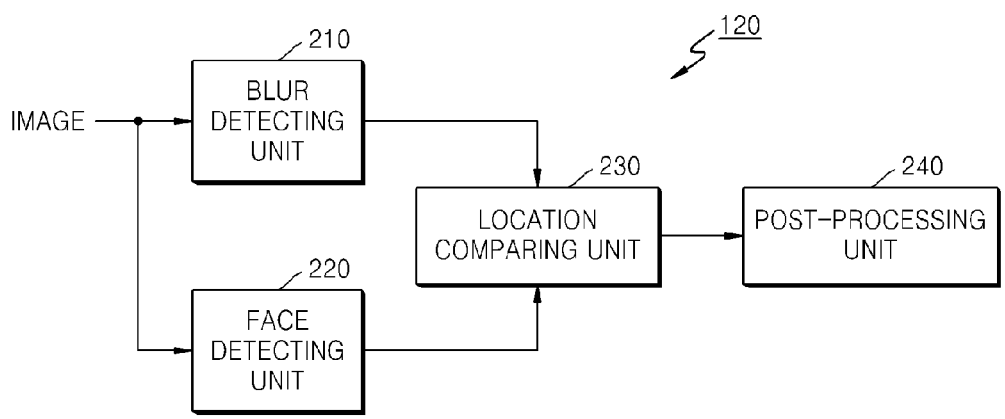
FIG. 2 is a block diagram of an image processing unit of the apparatus of FIG. 1.

FIG. 2 is a block diagram of the image processing unit 120 of the apparatus of FIG. 1.

Referring to FIG. 2, the image processing unit 120 includes a blur detecting unit 210, a face detecting unit 220, a location comparing unit 230, and a post-processing unit 240.

The blur detecting unit 210 detects a blur area or a non-blur area in an image by analyzing a frequency component of the image by using various known technologies.

For example, the blur detecting unit 210 extracts a border portion from the image, and detects a blur with reference to the degree of change in the values of pixels within the border portion.

There are various known face detection technologies, for example, a face detection technology using template matching, and an appearance-based face detection technology using statistical facial features.

For example, the face detecting unit 220 detects a face area in the image based on previously analyzed facial features, and obtains the number, location, and size of faces in the face area.

The location comparing unit 230 determines whether there is overlap between the face area and the blur area (or the non-blur area) by comparing a location of the blur area detected by the blur detecting unit 210 with a location of the face area detected by the face detecting unit 220.

The post-processing unit 240 determines whether the image is an intended blur image according to a result of the comparison performed by the location comparing unit 230, and determines whether the image is to be restored through "sharpening" or is to be considered as an undesirable image according to a result of the determination of whether the image is an intended blur image.

FIG. 3A is a flowchart illustrating an example of a method of processing an image, according to an exemplary embodiment of.

In operation 302, a face area and a blur area are detected in an image that is captured or previously stored by using a face detection algorithm or a block detection algorithm.

In operation 304, the degree of overlap between the face area and the blur area is checked by comparing a location of the face area with a location of the blur area.

In operation 306, it is determined whether the image is a normal image or an abnormal image according to the degree of overlap between the face area and the blur area.

Figure 3B:
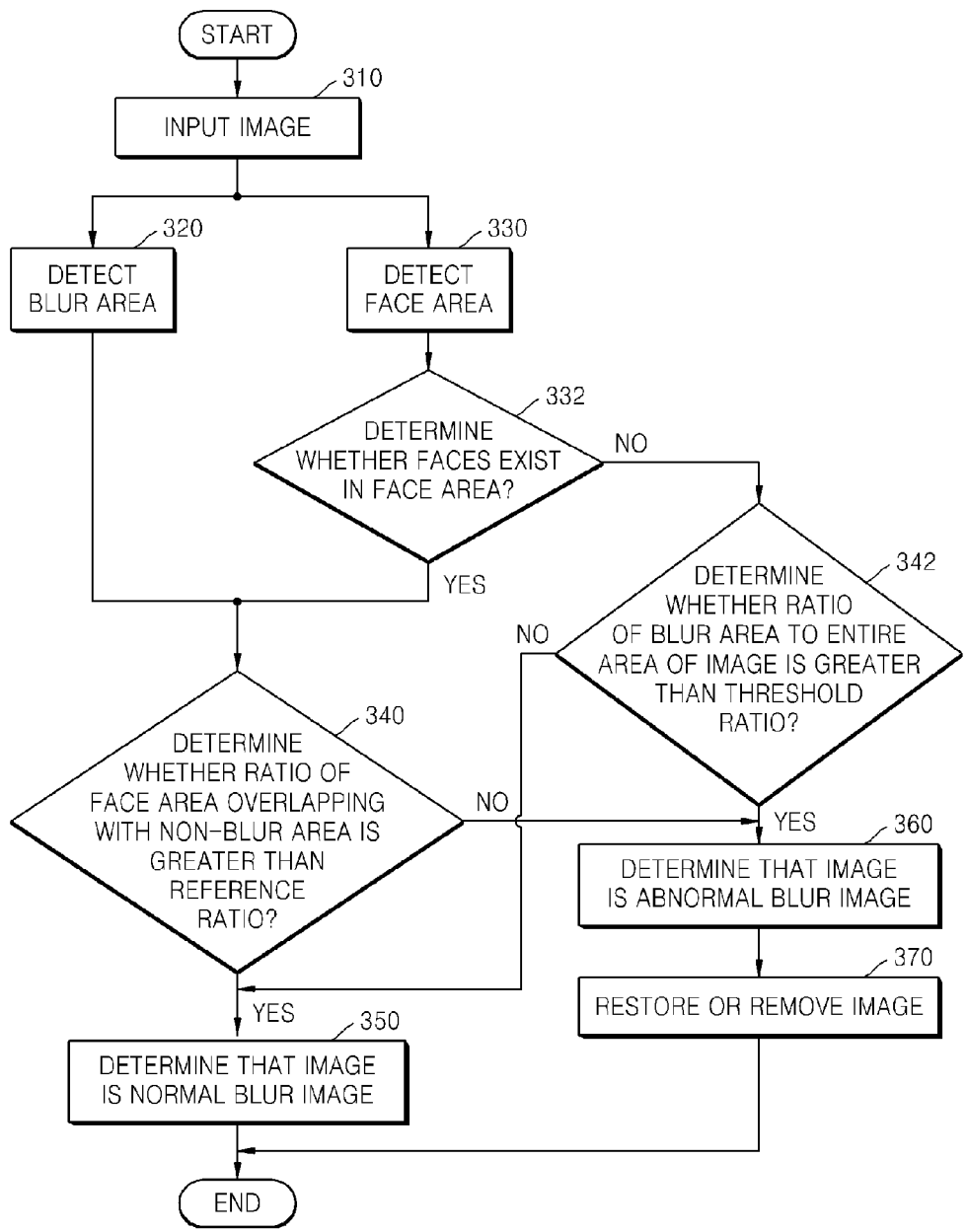
FIG. 3B is a detailed flowchart illustrating the method of FIG. 3A.

FIG. 3B is a detailed flowchart illustrating the method of FIG. 3A.

In operation 310, an image which is captured by a camera or previously stored in a memory is input.

In operations 320 and 330, a blur area (or a non-blur area) and a face area are detected in the image.

For example, the blur area and the non-blur area may be detected by analyzing a frequency component of the image. Also, the face area may be detected based on previously analyzed facial features.

In operation 332, it is determined whether faces exist in the face area. The number, location, and size of the faces in the face area are obtained.

If the blur area is detected or if it is determined that faces exist in the face area, the degree of overlap between the face area and the non-blur area is checked by comparing a location of the face area with a location of the non-blur area.

In operation 340, it is determined whether a ratio of the face area overlapping with the non-blur area is greater than a reference ratio in order to check the degree of overlap between the face area and the non-blur area. The reference ratio may be determined experimentally, and may be, for example, about 80 percent.

In general, when a plurality of individuals are photographed, a main figure tends to be conspicuously near the middle of the picture. Accordingly, when a plurality of faces are detected, there are various ways of determining whether there is overlap between the face area and the blur area.

For example, it may be determined whether there is overlap between the non-blur area and an area of a largest face from among the plurality of faces.

Alternatively, it may be determined whether there is overlap between the non-blur area and an area of a face closest to the center of the image.

Alternatively, it may be determined whether there is overlap between the non-blur area and an area of a face having a size greater than a threshold size.

If it is determined in operation 340 that the ratio of the face area overlapping with the non-blur area is greater than the reference ratio, the method proceeds to operation 350. In operation 350, it is determined that the image is a normal blur image that is intended by a user.

Otherwise, if it is determined in operation 340 that the ratio of the face area overlapping with the non-blur area is less than or equal to the reference ratio, the method proceeds to operation 360. In operation 360, since the degree of overlap between the face area and the blur area is greater than the reference ratio, it is determined that the image is an abnormal blur image resulting from a limitation of a photographing device.

In operation 370, the image, which is determined as an abnormal blur image, is restored, or separately managed, for example, automatically removed or recommended to be removed. Alternatively, the image may be automatically removed.

Alternatively, a menu indicating whether the image is to be restored or to be removed may be displayed on the screen.

Alternatively, the removed image may be managed in a separate category.

If it is determined in operation 332 that faces do not exist in the face area, the method proceeds to operation 342. In operation 342, it is determined whether a ratio of the blur area to an entire area of the image is greater than a threshold ratio in order to determine whether a motion blur or an out-of-focus blur exists in the image. The threshold ratio may be determined experimentally.

If it is determined in operation 342 that the ratio of the blur area to the entire area of the image is greater than the threshold ratio, the method proceeds to operation 360. In operation 360, it is determined that the image is an abnormal blur image that needs to be corrected or recommended to be removed. On the other hand, if it is determined in operation 342 that the ratio of the blur area to the entire area of the image is not greater than the threshold ratio, the method proceeds to operation 350. In operation 350, it is determined that the image is a normal blur image.

Accordingly, the method of FIGS. 3A and 3B can efficiently manage or edit pictures by determining whether a blur occurring in an image is normal or abnormal and automatically correcting, or separately managing, for example, automatically removing or recommending to remove, the image based on a result of the determination of whether the blur occurring in the image is normal or abnormal.

FIG. 4 is a flowchart illustrating an example of a process of checking the degree of overlap between a face area and a non-blur area in the method of FIG. 3A.

A process of checking the degree of overlap between a face area and a non-blur area will now be explained with reference to FIGS. 5A through 5C.

An original image having N×M blocks is input, where N and M are integers greater than 1. A face area and a blur area are simultaneously detected by using the original image of N×M blocks.

In operation 410, the original image of N×M blocks is converted into a first binary image where the blur area and a non-blur area are expressed with binary numbers.

For example, referring to FIG. 5A, pixels included in the blur area are denoted by "0", and pixels included in the non-blur area are denoted by "1".

In operation 420, the original image of N×M blocks is converted into a second binary image where the face area and the non-face area are expressed with binary numbers.

For example, referring to FIG. 5B, pixels included in the face area are denoted by "1", and pixels included in the non-face area are denoted by "0".

In operation 430, a third binary image is generated by "AND"ing the first binary image with the second binary image.

For example, referring to FIG. 5C, the third binary image is generated by ANDing pixels of the first binary image of FIG. 5A with corresponding pixels of the second binary image of FIG. 5B. That is, a binary number "1" denote pixels included in both the non-blur area and the face area in FIG. 5C.

In operation 440, a ratio of the face area to the non-blur area is obtained by comparing the third binary image with the second binary image.

For example, a ratio of the face area to the non-blur area is obtained by comparing the number of pixels denoted by "1" in the third binary image of FIG. 5C with the number of pixels denoted by "1" in the first binary image of FIG. 5A.

Accordingly, exemplary embodiments can determine whether an image is an abnormal blur image and a normal blur image by checking the degree of overlap between a face area and a blur-area or a non-blur area in the image.

Although the apparatus for processing the image has been exemplarily explained, exemplary embodiments may be applied to a digital camera, a digital printer, a digital TV, and so on.

The present inventive concept may be embodied as computer-readable codes in a computer-readable recording medium. The computer readable recording medium may be a computer readable storage medium or a computer readable transmission medium. The computer-readable storage medium may be any recording apparatus capable of storing data that is read by a computer system. Examples of the computer-readable storage medium include read-only memories (ROMs), random-access memories (RAMs), CD-ROMs, magnetic tapes, floppy disks, and optical data storage devices. The computer readable medium may be distributed among computer systems that are interconnected through a network, and may be stored and implemented as computer readable codes in the distributed system. The computer readable transmission medium may be any transmission medium over which data may be sent. Examples of the computer-readable transmission medium include a carrier wave, serial transmission over USB, or the like.

While the present inventive concept has been particularly shown and described with reference to exemplary embodiments thereof, it will be understood by one of ordinary skill in the art that various changes in form and details may be made therein without departing from the spirit and scope of as defined by the following claims.

What is claimed is:

1. A method of processing an image, the method comprising: detecting a face area and a blur area from an image;
checking a degree of overlap between the face area and the blur area by comparing a location of the face area with a location of the blur area; and
determining whether the image is an abnormal image according to the degree of overlap between the face area and the blur area.

2. The method of claim 1, wherein the detecting of the face area and the blur area comprises:
detecting the face area based on previously analyzed facial features, and
detecting the blur area and a non-blur area of the image by analyzing a frequency component of the image.

3. The method of claim 1, wherein the checking of the degree of overlap between the face area and the blur area comprises:
obtaining a ratio of the face area to the non-blur area by comparing the blur area with the face area; and
checking the degree of overlap between the face area and the blur area according to the ratio of the face area to the non-blur area.

4. The method of claim 1, wherein the checking of the degree of overlap between the face area and the blur area comprises:
inputting an original image having an original size and converting the original image into a first binary image in which the blur area and a non-blur area are expressed with binary numbers;
converting the original image having the original size into a second binary image where the face area and the non-face area are expressed with binary numbers;
generating a third binary image by ANDing the first binary image with the second binary image; and
obtaining a ratio of the face area to the non-blur area by comparing the third binary image with the second binary image.

5. The method of claim 4, wherein the obtaining of the ratio of the face area to the non-blur area comprises:
obtaining a ratio of the face area to the non-blur area by comparing a number of pixels of an overlapping area between the face area and the non-blur area in the third binary image with a number of pixels of the face area in the second binary image.

6. The method of claim 4, wherein, if a ratio of the face area overlapping with the non-blur area is greater than a reference ratio, it is determined that the image is a normal blur image, and if the ratio of the face area overlapping with the non-blur area is less than or equal to the reference ratio, it is determined that the image is an abnormal blur image.

7. The method of claim 6, wherein, if it is determined that the image is an abnormal blur image, the method further comprises automatically correcting or removing the image.

8. The method of claim 6, wherein, if it is determined that the image is an abnormal blur image, the method further comprises displaying on a screen a menu indicating whether the image is to be restored or removed.

9. The method of claim 1, wherein, if a plurality of faces are detected in the face area, the checking of the degree of overlap between the face area and the blur area comprises determining whether there is overlap between the non-blur area and an area of a largest face from among the plurality of faces.

10. The method of claim 1, wherein, if a plurality of faces are detected in the face area, the checking of the degree of overlap between the face area and the blur area comprises checking whether there is overlap between the non-blur area and an area of a face closest to a center of the image.

11. The method of claim 1, wherein, if a plurality of faces are detected in the face area, the checking of the degree of overlap between the face area and the blur area comprises determining whether there is overlap between the non-blur area and an area of a face having a size greater than a threshold size.

12. The method of claim 1, wherein, if faces do not exist in the face area, the method further comprises:
determining a ratio of the blur area to an entire area of the image;
correcting or separately managing the image according to the ratio of the blur area to the entire area of the image.

13. An apparatus for processing an image, the apparatus comprising:
a blur detecting unit that analyzes a frequency component of an image and detects a blur area in the image;
a face area detecting unit that detects a face area in the image based on previously analyzed facial features;
a location comparing unit that obtains a ratio of the blur area to the face area by comparing a location of the blur area detected by the blur detecting unit with a location of the face area detected by the face detecting unit; and
a post-processing unit that determines whether the image is an abnormal image according to a result of the comparison performed by the location comparing unit, and corrects or removes the image if it is determined that the image is an abnormal image.

14. The apparatus of claim 13, wherein the post-processing unit determines whether a blur occurring in the image is intended according to the result of the comparison performed by the location comparing unit, and restores the image or considers the image an undesirable image according to a result of the determination of whether the blur occurring in the image is intended.

15. A non-transitory computer-readable recording medium having embodied thereon a program for executing a method comprising:
detecting a face area and a blur area from an image;
checking a degree of overlap between the face area and the blur area by comparing a location of the face area with a location of the blur area; and
determining whether the image is an abnormal image according to the degree of overlap between the face area and the blur area.

* * * * *